Patented July 14, 1936

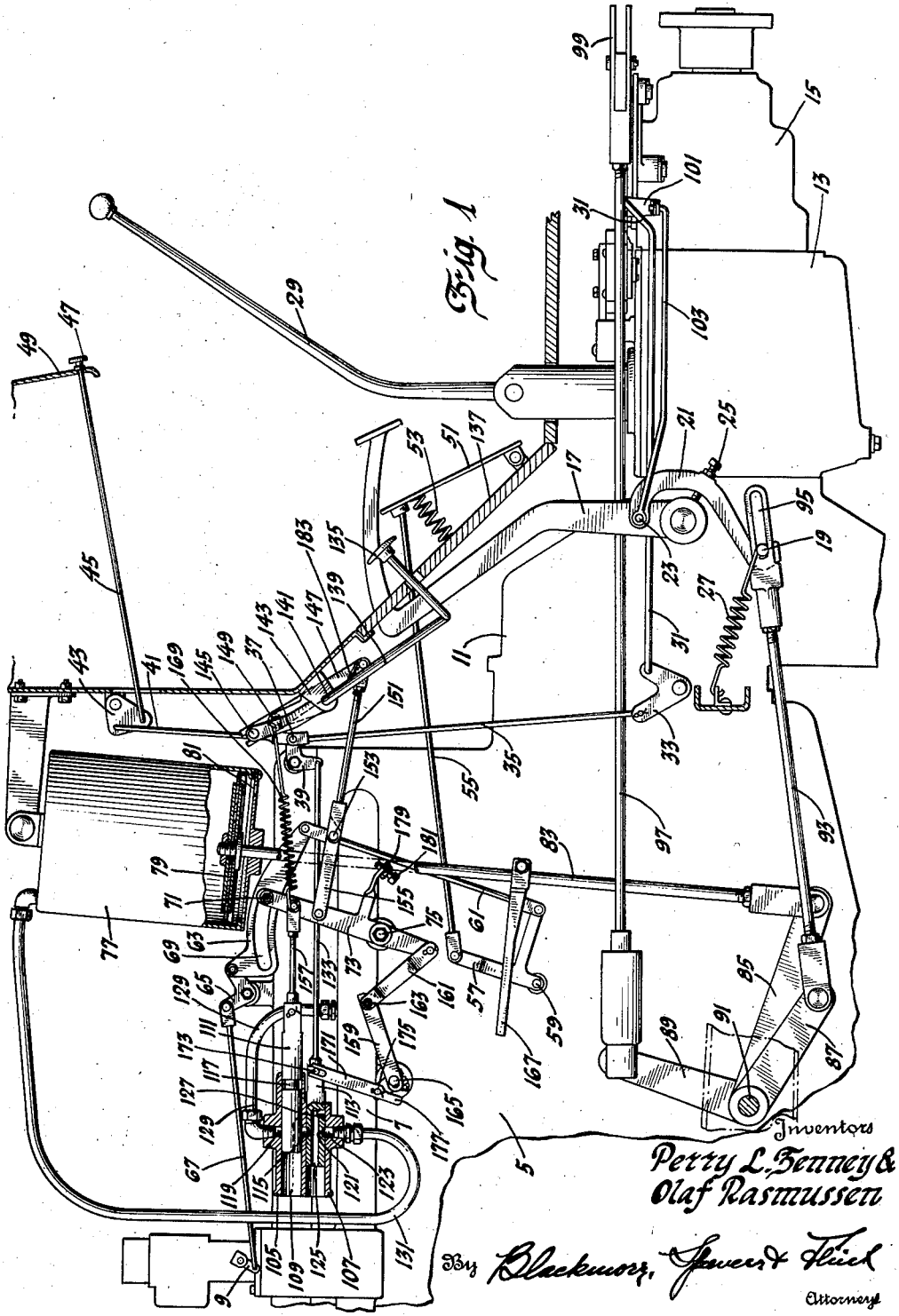

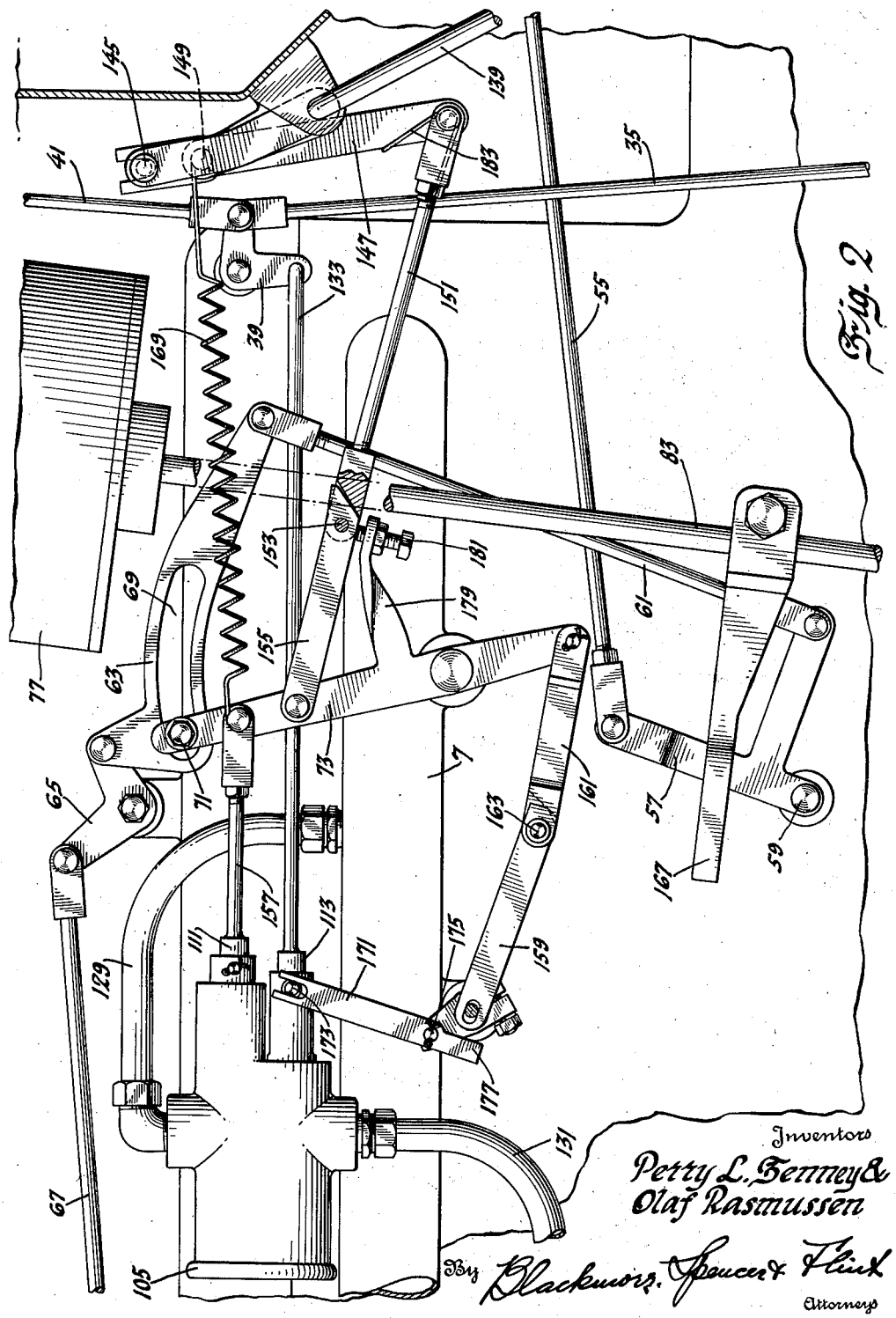

2,047,807

UNITED STATES PATENT OFFICE 2,047,807

TRANSMISSION CONTROL

Perry L. Tenney and Olaf Rasmussen, Lansing, Mich., assignors to General Motors Corporation, Detroit, Mich., a corporation of Delaware Application February 20, 1933, Serial No. 657,623

16 Claims. (Cl. 192—.01)

This invention relates to control mechanism for motor vehicles and more particularly to a control for a power device operable to release the clutch and change the speed ratio of the transmission mechanism.

An object of the invention is to provide a control mechanism as above outlined which will not require any manipulation of the manually movable throttle lever when changing driving ratios.

Another object is to provide a control mechanism as above, so associated with a free wheel control device as to prevent operation of the power device when the free wheel device is locked out of operation.

Other objects and advantages will be understood from the following description.

In the drawings accompanying this description Fig. 1 is a view in side elevation.

Fig. 2 is a similar view on a larger scale showing parts in different relative positions.

Referring by reference characters to the drawings, numeral 5 represents the engine of a motor vehicle. The intake manifold is shown at 7 and the conventional throttle valve is operated by an external lever 9. Numeral 11 represents the clutch housing and 13 is the housing for a substantially conventional change speed transmission mechanism. To the rear of housing 13 is another housing 15 for enclosing an overrunning clutch constituting a free wheel unit.

At 17 is a manually operable clutch lever. Numeral 19 is applied to the end of a clutch throwout lever. This lever is the conventional lever for clutch release, and extends horizontally inward from its illustrated end. Its relation to the clutch is like that of lever 44 in Whitacre 1,703,650, February 26, 1929. It is moved rearwardly to release the clutch by the rotation of lever 17 acting in conjunction with an arm 21 pivoted at 23 to the clutch pedal 17, engaging the throwout lever 19 and adjustably positioned relative to the fulcrum part of lever 17 by means of a screw 25. It will be understood that the depression of pedal 17, rotating the same in a counter-clockwise direction, releases the clutch within housing 11 against the tension of the usual clutch-engaging springs. Spring 27 anchored at a fixed point engages lever 19 and tends to hold the levers 19 and 17 in the position shown.

A manually operable lever 29 functions in the usual way to change the speed ratios of the transmission mechanism within housing 13. No novelty for this mechanism as such is herein claimed.

The free wheel unit is not, per se, a part of the invention herein claimed. As is usual it includes an overrunning clutch and a movable part to lock together the parts of the overrunning clutch to render it inoperative and to constitute a positive drive. The shift mechanism to render the free wheel device active or to lock it out of action involves a lever, not shown, as is usual in such devices. The lever is rocked by a rod 31 to be connected at one end to the above-mentioned lever and at the other end to a bell crank 33. A rod 35 is pivoted at one end to the other end of bell crank 33 and the other end of the rod is connected at 37 both to a bell crank 39 and also to a rod 41. Rod 41 is connected to a bell crank 43 from which an operating rod 45 extends to a button 47 at the instrument panel 49. In the position of the button 47 as illustrated in Fig. 1 the free wheel device is in action. If the button 47 is pulled out the linkage described operates to lock out of action the overrunning clutch in housing 15 by positively clutching together the two shaft members which before were connected by the free wheel clutch.

The throttle is operated as usual by a pedal designated on the drawings by numeral 51. This pedal is held in its released position (engine idling position) by a spring 53. From the pedal 51 a link 55 engages one arm of a bell crank 57 pivoted at 59. From the other arm of the bell crank a rod 61 extends to one end of a lever 63. The other end of lever 63 is pivoted to a bell crank 65, from a second arm of which a rod 67 is connected to the throttle lever 9. Lever 63 has a slot 69 within which is a pivot 71 about which the lever 63 rotates in the act of opening and closing the throttle by the use of pedal 51. The pivot 71 is carried on the end of a control arm 73, the latter pivoted at 75. When the pedal is depressed the linkage operates to rotate lever 63 counter-clockwise about pivot 71 and to thereby open the throttle. Reverse rotation of the pedal 51 by spring 53 serves in an obvious manner to close the throttle to its idling position.

At 77 is a power cylinder in which is movably mounted a piston 79. The top of the cylinder above the piston is closed except for a connection with a suction conduit to be hereinafter described. A portion of the cylinder beneath the piston is always subject to atmospheric pressure as is indicated on the drawings by the provision of an opening 81. The piston rod 83 is connected to an arm 85 rotatable together with arms 87 and 89 about axis 91. If air be withdrawn from above piston 79 the unbalanced air pressure upon the piston operates through rod 83 to simultaneously rock arms 85, 87, 89 in a counter-clockwise direction.

From arm 87 a rod 93 extends to and engages the end of arm 21. The end of rod 93 is forked to straddle arm 21 and slotted to receive the end of lever 19. By means of rod 93 as above described, counter-clockwise rotation of arm 87 pushes the lower end of arm 21 which itself pushes the lever end 19 and releases the clutch. The slot 95 makes possible the release of the clutch by the pedal 17 without movement of rod 93 and the connected parts.

Arm 89 is connected to a rod 97 which has a forked and slotted end at 99 which movably engages a ratio shifting device. This ratio shifting device is intended to be actuated by opposite reciprocating movements of rod 97 to make a shift from low speed to second speed and thereafter progressive shifts between second speed and high speed. Movements of rod 97 to the left make the several shifts and movements to the right restore the shifting mechanism to a position from which the next shifts are made. This shifting mechanism is not a part of the invention herein claimed. The presence of the slot at the connection with the shifting device insures that the clutch shall be released by rod 93 before the shifting mechanism is engaged by the end of part 99 to shift the change speed driving ratio.

It may be explained at this point that the button 47 should not be manipulated to move the free wheel control lever except when the clutch is released. To insure this action there is provided a latch 101 designed to normally engage and hold the free wheel control lever. This latch corresponds in function to lever or latch 78 in Vincent 1,878,556, September 20, 1932. Depression of the clutch pedal 17 pulls a rod 103 connected thereto and to the latch 101 to render the free wheel operating device subject to actuation by the button 47. By this arrangement depression of the clutch pedal is necessary prior to the operation of the free wheel locking mechanism by the button 47.

Valve mechanism is provided which controls the operation of the power cylinder. This mechanism comprises valve cylinders 105 and 107. The cylinders have ends 109 which are open and within the cylinders are reciprocating pistons 111 and 113. Piston 111 has a recess 111a to provide communication between the open end of the cylinder and an opening 115 in the wall between the two cylinders. Piston 111 also has an annular groove 117 to register at times with opening 115 and with an opposite cylinder opening 119. Piston 113 has an annular groove 121 intended to afford communication between opening 115 and an opposite opening 123 in the cylinder wall. Piston 113 also has an axial passage 125 and a radial branch 127 connected therewith, the latter to register with opening 123 in one position of the piston. From opening 119 a conduit 129 extends to the manifold. From opening 123 a conduit 131 extends to power cylinder 77.

The vacuum power cylinder 77 serves to successively operate the clutch and change speed mechanism as stated above, but it is preferred to have it so operate only when the free wheel device is functioning. This is to avoid severe shocks to the transmission mechanism in the event of careless shifting. Therefore there is a connection between the operating mechanism for the free wheel unit and the valve construction to insure the venting of the power cylinder whenever the free wheeling clutch is locked out of action.

To that end piston 113 is connected by a rod 133 to the bell crank 39 in such a way that when the button 47 and the parts connected thereto are in free wheeling position as shown in Fig. 1; the annular groove of piston 113 is in a position to permit a free passage between openings 115 and 123, but when the button is shifted to free wheel lockout position conduits 127 and 125 provide a communicating passage from opening 123 to the open end of the cylinder, whereby the power cylinder is vented through pipe 131 and no power operation is possible.

The power operation is directly controlled by a button 135 located just above the floor board 137 and constituting the power end of a lever 139 fulcrumed at 141 to a bracket 143 and extending to an end 145 where it engages the end of a second lever 147 fulcrumed on the bracket at 149. This second lever is connected at its lower end to a rod 151 jointed as at 153 to a second rod 155, the latter connected at its end to the control arm 73. From arm 73 a rod 157 extends to piston 111. With the button 135 and its connections in the position shown by Fig. 1, opening 115 is in communication with the open end of the cylinder 15 and the power cylinder is vented. If the button 135 is depressed, the groove 117 is moved into a position to register with openings 119 and 115 and the manifold may evacuate the power cylinder which successively operates the clutch and the change speed device as explained above.

With the provisions of this invention it is unnecessary to release the accelerator pedal when shifting. If the accelerator pedal is released lever 63 rotates about pivot 71 to a position such that the arc of slot 69 in lever 63 has the pivot 75 as its center and then the rotation of lever 73 has no effect on lever 63. On the other hand, if the right end of lever 63 has been moved up (about 71 as the center) in the act of opening the throttle, the counter-clockwise rotation of lever 73 for the purpose of shifting rocks the lever 63 clockwise about its right end thereby closing the throttle to idling position, the position it should assume when changing speed ratios.

Nor is it necessary to manually hold button 135 depressed during the action of clutch release and speed ratio changing. Links 159 and 161 are provided so that when the button 135 is depressed and released the action is automatic. These links are pivoted together at 163. Link 161 is pivoted to the end of control arm 73 and link 159 has a slotted end engaging a fixed pivot 165. In the act of depressing the button 135 the control arm 73 swings counterclockwise sufficiently to permit the links 159 and 161 to drop past center as will be seen from Fig. 2. Therefore, the control arm 73 is held from clockwise rotation in the position shown by Fig. 2 until the joint between links 159 and 161 is broken. Until so broken, the control rod is in the position to keep the parts controlled thereby in the position shown by Fig. 2 in which position the power cylinder is operable to open the clutch and the throttle remains closed. The upward movement of the piston under the influence of engine suction releases the clutch and operates the shift mechanism in the order stated. Before the piston can descend to reversely reciprocate the rod 97 and to reengage the clutch, the joint at 163 must be broken. This is accomplished by an arm 167 secured in correctly adjusted position on the piston rod 83, its end operable to engage and break the joint when the piston nears the end of its upward movement. After the joint is broken the spring 169 withdraws the control rod and vents the power cylinder. Venting of the power cylinder permits the reengagement of the clutch. In so withdrawing the control rod, lever 63 swings back toward open throttle position.

Since, when the free wheeling device is locked out, there could be no means of breaking the joint between links 159 and 161 should they by any chance tend to assume the locked position of Fig. 2, there is provided a rod 171 pivoted at 173 to the piston 113 and at 175 near the pivot 165. This rod 171 has an end 177 which is so moved by the act of moving piston 113 to its venting position as to positively prevent the movement of links 159 and 161 to the locked position of Fig. 2. It will be understood that in passing from the position of Fig. 1 to that of Fig. 2 through a link aligned position, the movement of link 159 is such as to bring the pivot 165 to the right end of the slot. This is impossible when the end of 159 is engaged by the part 177.

As a further feature of precaution the control arm 73 has a lateral branch 179 provided with an adjusting member 181 which is intended to engage and break the joint at 153 just before the control arm pivot 71 reaches the limit of its movement in slot 69 to thereby prevent any damaging movement of the arm in the event of an effort to push pivot 71 beyond the end of the slot 69. It also permits the mechanism to function if the button is held down. Spring 183 associated with parts 147 and 151 tends to hold these parts in the position shown by Fig. 1.

The operation is as follows: Let it be assumed that the car is at rest and the engine idle. The clutch will then be released by depressing pedal 17 and the engine started as usual. A manual shift to low enables the car to start upon release of pressure on pedal 17. Let it be further assumed that the free wheeling device is in operation. This corresponds with the position of plunger 113 as in Fig. 1. It is now desired to shift to second speed. Pedal 51 need not be released. The operator merely depresses button 135. Immediately thereafter he releases it. Depression of the button 135 swings control rod 73. This operates to swing lever 63 in a direction to close the throttle to idling position and it also opens the valve to permit engine suction to raise piston 79. This operates to swing lever arms 87 and 89 to open the clutch and shift the driving ratio. As the control rod approached the position of Fig. 2 the joint 163 passed center and locked the control rod from return. After the clutch is released and the shift made part 167, moving up with the piston rod, breaks joint 163 whereupon spring 169 swings control rod 73, vents the power cylinder and reopens the throttle valve by restoring the lever 63 to its former position. Subsequent shift to high speed is made by another depression of the button. The automatic mechanism is inoperative in the event that the free wheeling clutch is locked out, this being accomplished by the simultaneous movement of plunger 113 to a position where it serves to vent the power cylinder regardless of the position of plunger 111.

We claim:

1. In combination, an engine having a throttle and a manually operable control therefor, a clutch and a change speed mechanism, engine operated means including a part movable in response to engine suction, connections between said engine operated means and said clutch and change speed transmission, a manually operable control for said engine operated means also operable independently of the manually operable throttle control to close the throttle to idling position before rendering the engine operated means operable.

2. The invention defined by claim 1 together with a lock device operable in response to the actuation of the manually operable control of the engine operated means to maintain the engine operated means in action and the throttle in idling position, and means responsive to the movements of said connections between the engine operated means and said clutch and change speed mechanism to automatically release said lock.

3. The invention defined by claim 1 together with a lock device operable in response to the actuation of the manually operable control of the engine operated means to maintain the engine operated means in action and the throttle in idling position, and means responsive to the movements of said connections between the engine operated means and said clutch and change speed mechanism to automatically release said lock together with a free wheel device, manually operable mechanism to lock out said free wheel device, and means actuated by a movement of said last-mentioned mechanism to its free wheel lock-out position to render the engine operated means inoperative.

4. In combination, an engine, a throttle, a clutch, a change speed transmission, power operated means to release the clutch and shift the charge speed transmission, first manually operated means to control said power operated means and including a control arm, second manually operated means to control the throttle and including a lever, said control arm carrying the fulcrum for said lever.

5. The invention defined by claim 4, said lever having a slot to receive said fulcrum and said fulcrum movable in said slot to control said throttle independently of the second manually operated means.

6. The invention defined by claim 4, said power operated means comprising a cylinder and a piston movable therein, a conduit from said cylinder to a source of suction and a valve in said conduit, said first manually operated means being connected to said valve.

7. The invention defined by claim 4 together with a jointed linkage to lock said control arm in a position corresponding to the active position of said power operated means.

8. The invention defined by claim 4 together with a jointed linkage to lock said control arm in a position corresponding to the active position of said power operated means together with a free wheeling device, manually operated means to render said device inoperative and to prevent said jointed linkage from assuming a locking position.

9. In combination, an engine having a manifold and a throttle valve, a clutch, a change speed transmission, a vacuum cylinder having a piston, connections therefrom to the clutch and change speed mechanism, a conduit between the manifold and cylinder, said conduit having a valve therein movable to a first position to vent the cylinder and to a second position to connect the cylinder and manifold, manually operable means to accuate said valve and including a control arm, said control arm being connnected to said valve, and means to lock said control arm in a position corresponding to the second position of the valve, and means carried by said connections to break said lock means.

10. The invention defined by claim 9 together with a free wheel device, manually operable means to simultaneously lock out said free wheel device and to move said control valve to its first position.

11. In combination, an engine having a manifold and a throttle valve, a clutch, a change speed transmission and a free wheeling device, a vacuum cylinder, a connection between the vacuum cylinder and the clutch and change speed device whereby the clutch and change speed device are operated in sequence, a conduit between the manifold and vacuum cylinder, a valve in said conduit, said valve having a first position to vent the vacuum cylinder and a second position to open the conduit between the manifold and the vacuum cylinder, a pivoted control arm, a connection between the control arm and the valve, yieldable means to move the control arm to cylinder venting position, manually operable means to move the control arm to its conduit open position, a second manually operable member, linkage between said second manually operable member and including a lever connected thereto to operate the throttle, said control arm connected to said last-mentioned lever to move said lever and control the throttle independently of said manually operable throttle controlling member.

12. The invention defined by claim 11 together with locking means to hold said control arm in conduit open position and throttle idling position, and means carried by said connection from the vacuum cylinder to open said lock means.

13. In combination, an engine having a manifold and a throttle, a clutch, a change speed transmission, a power device to release the clutch and shift the driving ratio of the transmission, manually operable means to control said power device and including a control arm, a second manually operable member, mechanism including a floating lever connecting said throttle and said second manually operable means, said control arm being movably connected to said lever of the throttle connection whereby upon operation of the throttle by the second manually operable means the lever rotates about its connection with the control arm and whereby the manipulation of the control arm rotates said lever to also control the throttle.

14. The invention defined by claim 13, said lever in the throttle connection having a slot to receive the control arm connection, said slot forming an arc with the control arm pivot as a center for the throttle idling position of the second manually operable member whereby the rotation of the control arm may then have no influence upon the throttle.

15. In combination, an engine, a clutch, change speed mechanism, said engine having a throttle, a movable control member, connecting means between said control member and throttle, power-operated mechanism having a movable element, connections between said element and the clutch and change speed mechanism, a device controlling the action of said power-operated mechanism, and other connecting means between said device and said movable control member whereby a movement of the movable control member may close the throttle and actuate the control device to render the power-operated mechanism operable to release the clutch and shift the change speed mechanism.

16. In combination, an engine, a clutch and change speed transmission associated therewith, a throttle for said engine, means to open the throttle, said means including a manually operable member power means including a movable part, a control device for said power means, connections from said movable part to said clutch and change speed transmission, linkage to actuate said control device whereby the power means may open the clutch and shift the transmission and also operable, independently of said manually operable throttle opening member, to close the throttle in the event that the throttle opening means is in open throttle position.

PERRY L. TENNEY.
OLAF RASMUSSEN.